US012747411B2

(12) United States Patent
Al-Bayati et al.

(10) Patent No.: US 12,747,411 B2
(45) Date of Patent: Sep. 29, 2026

(54) DETERGENT GEL COMPOSITION COMPRISING A FATTY ALCOHOL ETHOXYLATE

(71) Applicant: Reckitt Benckiser Finish B.V., Hoofddorp (NL)

(72) Inventors: Alias Younis Al-Bayati, Heidelberg (DE); Torsten Roth, Heidelberg (DE); Alexander Wink, Heidelberg (DE)

(73) Assignee: Reckitt Benckiser Finish B.V., Schiphol (NL)

( * ) Notice: Subject to any disclaimer, the term of this patent is extended or adjusted under 35 U.S.C. 154(b) by 240 days.

(21) Appl. No.: 18/566,052

(22) PCT Filed: May 30, 2022

(86) PCT No.: PCT/EP2022/064533
§ 371 (c)(1),
(2) Date: Nov. 30, 2023

(87) PCT Pub. No.: WO2022/253728
PCT Pub. Date: Dec. 8, 2022

(65) Prior Publication Data

US 2024/0360382 A1 Oct. 31, 2024

(30) Foreign Application Priority Data

Jun. 3, 2021 (GB) ...................................... 2107968

(51) Int. Cl.
*C11D 3/00* (2006.01)
*C11D 1/722* (2006.01)
(Continued)

(52) U.S. Cl.
CPC ............ *C11D 1/722* (2013.01); *C11D 3/2013* (2013.01); *C11D 3/386* (2013.01); *C11D 3/395* (2013.01);
(Continued)

(58) Field of Classification Search
CPC ....... C11D 1/722; C11D 3/2013; C11D 3/386; C11D 3/395; C11D 17/043; C11D 17/045;
(Continued)

(56) References Cited

U.S. PATENT DOCUMENTS 4,115,292 A 9/1978 Richardson et al.
4,846,992 A 7/1989 Fonsny
(Continued)

FOREIGN PATENT DOCUMENTS

CN 112592774 A 4/2021
EP 0339994 A2 11/1989
(Continued)

OTHER PUBLICATIONS

International Search Report dated Sep. 21, 2022, in PCT/EP2022/064533, filed May 30, 2022.
(Continued)

*Primary Examiner* — Eisa B Elhilo
(74) *Attorney, Agent, or Firm* — Lerner David LLP

(57) ABSTRACT

The present invention relates to a detergent gel composition. In particular, the invention relates to a packaged detergent gel composition comprising a fatty alcohol ethoxylate; wherein the fatty alcohol ethoxylate has the formula:

$$R{-}O(CH_2CH_2O)_xH$$

Figure 1:
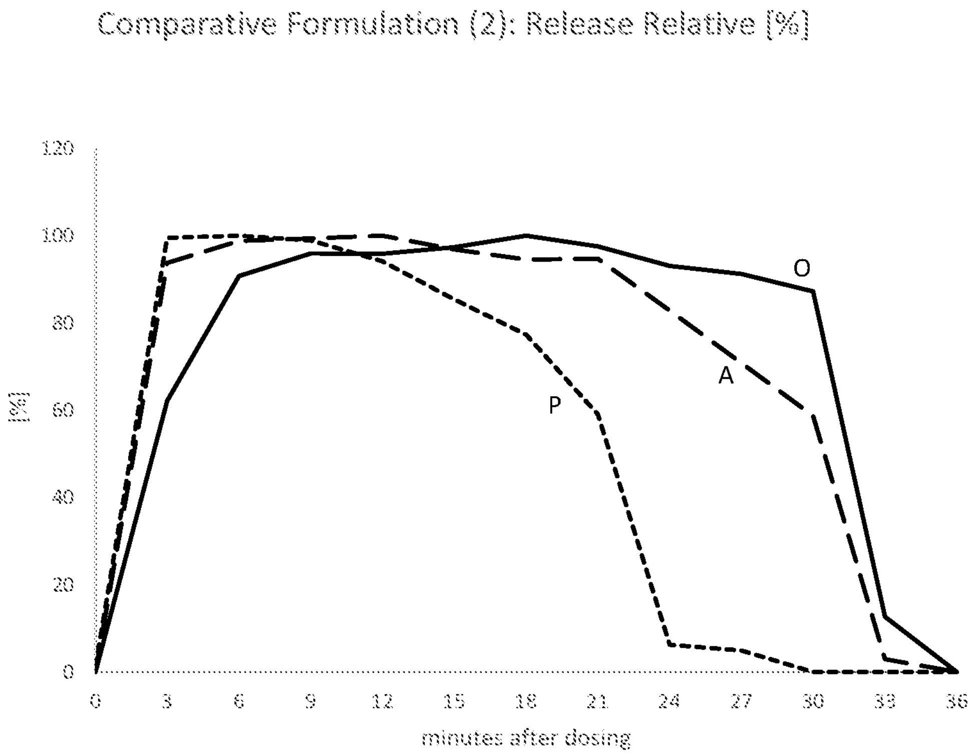

wherein,
R is a linear, saturated fatty alcohol, and
x is an integer having a value of at least 25;

wherein the packaged detergent gel composition further comprises at least one builder selected from the group consisting of hydroxycarboxylates, aminocarboxylates, phosphates, or the salts thereof;
(Continued)

Comparative Formulation (2): Release Relative [%]

and wherein the packaged detergent gel composition further comprises at least one mixed alkoxylate fatty alcohol nonionic surfactant.

20 Claims, 2 Drawing Sheets

(51) Int. Cl.
*C11D 3/20* (2006.01)
*C11D 3/386* (2006.01)
*C11D 3/395* (2006.01)
*C11D 17/04* (2006.01)

(52) U.S. Cl.
CPC .......... *C11D 17/043* (2013.01); *C11D 17/045* (2013.01); *C11D 2111/14* (2024.01)

(58) Field of Classification Search
CPC ... C11D 2111/14; C11D 2111/12; C11D 3/06; C11D 3/33; C11D 1/8255; C11D 3/2086; C11D 17/003; C11D 1/72; C11D 11/00
USPC .......................................................... 510/421
See application file for complete search history.

(56) References Cited

U.S. PATENT DOCUMENTS

2003/0195134 A1* 10/2003 Vandijk ................ C11D 3/3409 510/421
2015/0094251 A1* 4/2015 Rees ...................... C11D 1/825 510/405
2015/0252295 A1* 9/2015 Roerdink Lander ........................ C11D 3/3757 510/451
2020/0024549 A1 1/2020 Kurth et al.

FOREIGN PATENT DOCUMENTS

EP 2970839 B1 * 2/2017 ........... C11D 17/045
WO WO 2011042737 A1 * 4/2011 ........... C11D 3/3942
WO 2020104320 A1 5/2020

OTHER PUBLICATIONS

Written Opinion of the International Searching Authority dated Sep. 21, 2022, in PCT/EP2022/064533, filed May 30, 2022.
PCT Demand for International Preliminary Examination filed Mar. 31, 2023 in PCT/EP2022/064533, filed May 30, 2022.
Written Opinion of the International Preliminary Examining Authority dated Apr. 13, 2023, in PCT/EP2022/064533, filed May 30, 2022.
International Preliminary Report on Patentability dated Jul. 3, 2023, in PCT/EP2022/064533, filed May 30, 2022.

* cited by examiner

DETERGENT GEL COMPOSITION COMPRISING A FATTY ALCOHOL ETHOXYLATE

TECHNICAL FIELD OF THE INVENTION

The present invention relates to a packaged detergent gel composition. In particular, the invention relates to a packaged detergent gel composition comprising at least one fatty alcohol ethoxylate. The invention further relates to methods of washing kitchenware or tableware, the use of a packaged detergent gel composition comprising fatty alcohol ethoxylates to treat kitchenware or tableware, and a detergent gel composition comprising a fatty alcohol ethoxylate.

BACKGROUND TO THE INVENTION

Gels are generally defined as a non-fluid colloidal network or polymer network that is expanded throughout its whole volume by a fluid, with hydrogels having water as the expanding or swelling agent. Herein, the term gel is not limited to a strictly colloidal composition and for the purposes of the present invention the term gel may be also considered to be a thickened liquid. The term 'gel-like' may refer to a combination of liquid and solid, or a suspension of solid-in-liquid, that has the appearance and/or consistency of a gel. Automatic dishwashing detergent gel compositions with a pleasing aesthetic profile, i.e., having a smooth, continuous visual appearance, are significantly more appealing to consumers than compositions purely in a granular, powder or tablet form. Gel compositions are often used in a multi-compartment product, in which the gel composition is present in one compartment, and one or more powders, tablets or granules are present in one or more further compartments. Detergent gel compositions in the form of a gel often comprise a thickening agent to attempt to provide a detergent gel composition which a consumer will find aesthetically pleasing and which includes desired dissolution and ingredient release properties. A suitable thickening agent should provide a favourable stability profile, such that the detergent gel composition exhibits good phase-stability during storage, primarily by having a high temperature of phase separation. The phase separation of a previously homogenous gel upon aging or storage at room temperature may convey to the consumer that the detergent gel composition has declined in activity, decomposed or is a poor-quality product. Maintaining the visual appearance of a detergent gel composition is, therefore, of significant importance.

A typical thickening agent used in conventional dishwashing detergent gel compositions is a polyalkylene glycol, for example a polyalkylene glycol with an ethylene oxide to propylene oxide ratio of 4:1. Polyalkylene glycols of this type are expensive to manufacture and provide little contribution to the cleaning performance profile (including the release profile) and shine performance profile of the detergent gel composition. Conventional detergent gel compositions comprising a polyalkylene glycol can exhibit phase separation at room temperature.

Attempts have been made to present detergent compositions which provide a controlled release of particular cleaning actives while maintaining a favourable cleaning performance profile and stability profile. Detergent gel compositions which attempt to provide a controlled release of particular cleaning actives typically use modified coating agents for the respective cleaning actives, for example as disclosed in EP1433839, or by a dedicated dosing step during the dishwashing cycle or a dedicated dosing device to provide a sequential release of cleaning actives. Unit-dose detergent compositions are known, for example detergent compositions enclosed in a water-soluble film container or compartment, which are added to the dishwasher prior to the start of a dishwashing cycle. Further conventional unit-dose products may comprise a multi-compartment container or capsule. The multi-compartment capsule may comprise two or more separated compartments, and within each compartment is typically located a detergent composition in the form of a solid or a detergent composition in the form of a liquid. In use, any cleaning actives located within the liquid compartment will rapidly dissolve into the wash liquor, while any cleaning actives located within the solid compartment are relatively slower to dissolve into the wash liquor. While such a product may provide a staggered release of cleaning actives, the release is not controlled, nor can the release profile be tailored to the relevant cleaning actives. As such, these products do not provide a satisfactory or optimal delayed release of cleaning actives.

Moreover, efforts to obtain a delayed dissolution profile typically rely on the delivery of actives to different wash cycles of the dishwasher, for example unit dose products releasing actives during a main wash cycle and a rinse cycle.

Coating agents, for example hydrophobic coating agents, and dedicated dosing steps and devices are often unreliable and do not provide the consumer with the controlled, delayed release of cleaning actives which is required for a favourable cleaning and shine performance and stability profile. In addition, coating agents do not contribute to any active cleaning effect and are therefore considered fillers, reducing the volume of the dosing format available for active ingredients.

Embodiments of the present invention seek to ameliorate these or other disadvantages and/or to provide an improved detergent gel composition which exhibits a controlled, delayed release of cleaning actives and which provides a favourable stability profile while maintaining or improving cleaning performance and shine performance, especially in unit-dose formats.

It is an aim of embodiments of the invention to overcome or mitigate at least one problem of the prior art, whether expressly disclosed herein or not.

SUMMARY OF THE INVENTION

According to a first aspect of the invention, there is provided a packaged detergent gel composition comprising at least one fatty alcohol ethoxylate, wherein the detergent gel composition is contained within a water-soluble container; wherein the fatty alcohol ethoxylate has the formula:

$$R—O(CH_2CH_2O)_xH$$

wherein,

R is a linear, saturated fatty alcohol, and x is an integer having a value of at least 25;

wherein the packaged detergent gel composition further comprises at least one builder selected from the group consisting of hydroxycarboxylates, aminocarboxylates, phosphates, or the salts thereof;

and wherein the packaged detergent gel composition further comprises at least one mixed alkoxylate fatty alcohol non-ionic surfactant.

The term fatty alcohol ethoxylate refers to a fatty alcohol alkoxylate with only ethoxylate groups, not with mixed ethoxylate and higher alkoxylate groups.

Preferably the packaged detergent gel composition comprises a unit-dose format.

By the term 'water-soluble container' as used herein, it is meant a container which at least partially dissolves in water or disperses in water at 20° C. within 10 minutes to allow for egress of the contents of the package into the surrounding water. By 'unit-dose', it is meant that the product comprises one or more compositions in the quantity required for a single wash cycle of a machine dishwasher.

Advantageously, the packaged detergent gel composition of the invention provides a platform for modular tailoring of the dissolution profile without affecting, or at least without significantly affecting, the cleaning performance and shine performance of the detergent gel composition. As such, the packaged detergent gel composition of the invention exhibits a controlled, delayed release profile of its cleaning actives, such that the composition can release specific cleaning actives at selected times during a wash cycle. It follows that the packaged detergent gel composition of the invention provides performance benefits, in particular a controlled, delayed release profile, without the need for modified coating agents or using dedicated dosing steps and/or devices.

The water-soluble container may comprise or be a water-soluble film. The water-soluble film may be rigid or flexible at room temperature.

Preferably, the water-soluble container comprises or is made of a poly(vinyl alcohol) (PVOH) film. The PVOH film may be partially or fully alcoholised or hydrolysed, for example, it may be from 40 to 100%, preferably 70 to 92%, most preferably about 85% to about 92%, alcoholised or hydrolysed, polyvinyl acetate film. The degree of hydrolysis is known to influence the temperature at which the PVOH starts to dissolve in water. 88% hydrolysis corresponds to a film soluble in cold (i.e. room temperature) water, whereas 92% hydrolysis corresponds to a film soluble in warm water. The film may be cast, blown or extruded. It may further be unoriented, mono-axially oriented or bi-axially oriented.

The PVOH film may be a thermoformed PVOH film.

The water-soluble container may be a multi-compartment water-soluble container. The multi-compartment water-soluble container may comprise two or more, three or more, four or more, five or more, or six or more separated compartments. Each of the compartments may be arranged side-by-side, concentrically, as sectors of a circle or in any suitable random or organised pattern. The container may comprise a first PVOH film comprising a pocket and a surrounding flange, and a second PVOH film, applied as a cover across the pocket and sealed across the flange. The container may comprise a first PVOH film comprising more than one pocket, for example two or more, three or more, four or more, five or more, or six or more pockets, and a surrounding flange, and a second PVOH film, applied as a cover across each pocket and sealed across the flange. In some embodiments there are three or four pockets.

Beneficially, a multi-compartment container allows compositions of different forms (i.e. solid form, liquid form or gel form) to be located within different compartments. Such a container is aesthetically more appealing to consumers.

The multi-compartment water-soluble container may comprise at least a first compartment and a second compartment. The multi-compartment water-soluble container may comprise at least a first compartment, a second compartment and a third compartment. In addition to the detergent gel composition comprising a fatty alcohol ethoxylate, the multi-compartment water-soluble container may comprise at least one further composition in the form of a solid, liquid, gel or paste. The at least one further composition in the form of a solid, liquid, gel or paste may comprise one or more cleaning actives selected from the list containing a builder, surfactant, alkalinity source, acidity source, enzyme, polymer, anti-corrosion agent, bleaching agent or care agent, or a mixture thereof.

The multi-compartment water-soluble container may comprise at least a first compartment and a second compartment, and the detergent gel composition may be located within the first compartment. The multi-compartment water-soluble container may further comprise one or more of a solid, a gel, a gel comprising a suspension of a powder or granules, and a liquid, in addition to the detergent gel composition of the invention. Each further composition may be located in its own separate compartment, or two or more further compositions may be co-located in at least one further compartment, for example.

The container may comprise at least one liquid cleaning active located within a second compartment. The at least one liquid cleaning active may be a bleaching system. The bleaching system may comprise a bleaching agent, for example a percarbonate, for example sodium percarbonate, a bleach booster, for example tetraacetylethylenediamine (TAED), and/or a bleach catalyst, for example a manganese complex comprising triazacyclononane (TACN), or any derivatives of a TACN ligand, for example 1,4,7-trimethyl-TACN, or manganese oxalate, manganese acetate or a dinuclear manganese complex, for example a dinuclear manganese complex comprising TACN or any derivatives of a TACN ligand, for example 1,4,7-trimethyl-TACN.

The container may comprise at least one solid cleaning active located within a second compartment. The at least one solid cleaning active may be a bleaching system. The solid bleaching system may be in the form of a powdered solid. The solid, or powdered solid, bleaching system may be in the form of a coated granule or co-granule with one or more cleaning actives. The bleaching system may comprise a bleaching agent, for example a percarbonate, for example sodium percarbonate, a bleach booster, for example tetraacetylethylenediamine (TAED), and/or a bleach catalyst, for example a manganese complex comprising 1,4,7-triazacyclononane (TACN), or any derivatives of a TACN ligand, for example 1,4,7-trimethyl-TACN, or manganese oxalate, manganese acetate or a dinuclear manganese complex, for example a dinuclear manganese complex comprising TACN or any derivatives of a TACN ligand, for example 1,4,7-trimethyl-TACN.

The detergent gel composition may be free from, or substantially free from, non-performance related ingredients. The detergent gel composition may comprise cleaning actives only. Alternatively, the detergent gel composition comprising a fatty alcohol ethoxylate may comprise one or more cleaning actives selected from the list containing a builder, surfactant, alkalinity source, acidity source, enzyme, polymer, anti-corrosion agent, bleaching agent or care agent, or a mixture thereof. The one or more cleaning actives may be in granular form. The one or more cleaning actives may be in granular form suspended in the detergent gel composition. The one or more cleaning actives may be at least one enzyme selected from the group comprising protease, amylase, lipase, cellulase and peroxidase, or mixtures thereof.

The container may comprise a first compartment comprising the detergent gel composition and at least one enzyme (which may be one or more enzymes selected from an amylase, a protease, a cellulase and a lipase, preferably at least an amylase and a protease), and a second compartment comprising a solid or liquid composition, preferably a solid bleaching composition, and more preferably a bleaching composition in the form of a powder or granules. Preferably, the at least one enzyme has a slower rate of release from the gel comprising the detergent gel composition of the invention than the rate of release of the one or more of the ingredients (for example, a cleaning active such as a bleaching composition) from the solid or liquid composition when the compartments rupture or dissolve. The at least one enzyme may have a timepoint of 80% release after the timepoint of 80% release of the one or more of the ingredients comprised in the solid or liquid composition when the compartments rupture or dissolve. The 'timepoint of 80% release' is typically measured as the timepoint of when a release of 80% of a particular ingredient (for example, a cleaning active or compound) has been reached. The at least one enzyme may have a timepoint of 80% release at least 1, 2, 3, 4, 5, 6, 7, 8, 9, 10, 12, 14, 16, 18, or at least 20 minutes after the timepoint of 80% release of the one or more ingredients comprised in the solid or liquid composition when the compartments rupture or dissolve. The timepoint of 80% release of the at least one enzyme may be between about 1 and about 30, between about 1.5 and about 28, between about 2 and about 26, between about 3 and about 24, between about 4 and about 22, or between about 5 and about 20 minutes after the timepoint of 80% release of any of the ingredients comprised in the solid or liquid composition when the compartments rupture or dissolve. Preferably, the timepoint of 80% release of the at least one enzyme is between about 3 and about 15 minutes after the timepoint of 80% release of any of the ingredients comprised in the solid or liquid composition when the compartments rupture or dissolve. Preferably, the ingredients comprised in the solid or liquid composition comprise a bleaching system. Advantageously, this means that the efficacy of the at least one enzyme is not inhibited, or at least not substantially inhibited, by any of the ingredients comprised in the solid composition, for example a bleaching composition. Moreover, the efficacy of any ingredients comprised in the solid or liquid composition, for example a bleaching composition, is not inhibited by the at least one enzyme, or inhibition is reduced, or that inhibition is reduced. Further advantageously, this means that there is a significant reduction in the number of 'side reactions' and production of by-products, which may otherwise inhibit performance of the at least one enzyme and/or any ingredients comprised in the solid or liquid composition. Additionally, the multi-compartment water-soluble container may comprise a third compartment comprising a solid or liquid. The solid or liquid comprised in the third compartment may comprise one or more cleaning actives. Preferably, the at least one enzyme has a slower rate of release from the gel comprising the detergent gel composition of the invention than the rate of release of the one or more of the cleaning actives comprised in the solid or liquid composition of the third compartment, when the compartments rupture or dissolve.

Advantageously, the detergent gel composition of the invention exhibits a delayed dissolution of ingredients comprised in the gel phase, relative to the rate of dissolution of ingredients comprised in a solid or liquid phase. As such, a tailored controlled release profile of ingredients can be provided by placing ingredients where the release is intended to be delayed, in a gel phase with the detergent gel composition.

The detergent gel composition in the first compartment preferably comprises at least one active ingredient, preferably an enzyme, more preferably amylase and/or protease, and the at least one active ingredient has a timepoint of 80% release of the active ingredient after a timepoint of 80% release of any solid or liquid cleaning active (such as a bleaching active) located within the second compartment when the compartments rupture or dissolve. The detergent gel composition in the first compartment preferably comprises at least one active ingredient, preferably an enzyme, more preferably an amylase and/or protease, wherein the timepoint of 80% release of the at least one active ingredient is between about 1 and about 30 minutes after the timepoint of 80% release of any solid or liquid cleaning active (such as a bleaching active) located within the second compartment when the compartments rupture or dissolve.

In general, the maximum dimension of the filled part of the water-soluble container (excluding any flanges) may be 10 cm or 8 cm. For example, a rounded cuboid container may have a length of 1 to 5 cm, especially 3.5 to 4.8 cm, for example 4.8 cm or 4.1 cm, a width of 1.5 to 4 cm, especially 3 to 4 cm, for example 3.7 cm or 3.9 cm, and a height of 1 to 2.5 cm, especially 1 to 2 cm, for example 1.25 to 1.75 cm.

The fatty alcohol ethoxylate may comprise a compound of the formula:

$$R—O(CH_2CH_2O)_xH \quad \text{(Formula (1))}$$

wherein,

R is a linear, saturated fatty alcohol, and x is an integer having a value of at least 25.

Preferably the detergent gel composition comprises less than 3 wt. %, less than 2 wt. %, less than 1 wt. % or less than 0.5 wt. % polyalkylene glycol. In some embodiments the detergent gel composition comprises substantially no polyalkylene glycol.

Providing a detergent gel composition comprising a compound of Formula (1) beneficially provides a detergent gel composition whereby polyglycol thickening agents can be removed and/or replaced with a compound of Formula (1), without compromising the cleaning performance profile or stability profile of the detergent gel composition. Further, compounds of Formula (1) are simple, alkoxylated surfactants, considerably cheaper to manufacture than many commonly-used polyglycol thickening agents such as polyalkylene glycols, therefore, the invention provides a detergent gel composition which exhibits an improved cleaning performance profile and improved stability profile, and which is cost-effective compared to a conventional detergent gel composition comprising polyglycol thickening agents.

Compounds of Formula (1) are manufactured by causing a fatty alcohol to react with ethylene oxide in stoichiometric proportions.

Advantageously, the detergent gel composition of the invention provides a platform for modular tailoring of the dissolution profile without affecting, or at least without significantly affecting, the cleaning performance of the detergent gel composition. As such, the detergent gel composition of the invention exhibits a controlled, delayed release profile of its cleaning actives, such that the composition can release specific cleaning actives at selected times during a wash cycle. It follows that the detergent gel composition of the invention provides performance benefits, in particular a controlled, delayed release profile, without the need for modified coating agents or using dedicated dosing steps and/or devices.

Further advantageously, the invention provides a detergent gel composition which does not exhibit phase separation at room temperature. As such, the detergent gel composition of the invention exhibits a favourable stability profile compared to a conventional detergent gel composition comprising a polyalkylene glycol. Further the invention provides a detergent gel composition which does not exhibit phase separation at temperatures considerably greater than that of room temperature, i.e. a temperature greater than about 37° C. As such, the detergent gel composition of the invention exhibits a favourable stability profile compared to a non-gel detergent composition, or a gel detergent composition, comprising a polyalkylene glycol, which exhibits phase separation at room temperature. As shown in the Examples, preferred embodiments of the detergent gel composition of the invention do not display any phase separation at storage temperatures of up to 37° C. Thus, favourable aesthetics of the detergent gel composition of the invention are maintained for the duration of typical storage.

Additionally, providing a compound of Formula (1) with its higher ethoxylated congeners, i.e. increasing the value of x, beneficially provides a detergent with a further increasing dissolution time and a higher phase separation temperature.

The linear, saturated fatty alcohol represented by 'R' may be a linear, saturated fatty alcohol having from about 10 to about 34 carbon atoms, from about 12 to about 30 carbon atoms, from about 14 to about 25 carbon atoms, from about 14 to about 20 carbon atoms, from about 16 to about 20 carbon atoms, or from about 16 to about 18 carbon atoms. The linear, saturated fatty alcohol may be a linear, saturated fatty alcohol having 14 carbon atoms. The linear, saturated fatty alcohol may be a linear, saturated fatty alcohol having 16 carbon atoms. The linear, saturated fatty alcohol may be a linear, saturated fatty alcohol having 18 carbon atoms. The linear, saturated fatty alcohol may be a linear, saturated fatty alcohol having 20 carbon atoms.

The integer represented by 'x' may be an integer having a value of at least about 25, at least about 26, at least about 27, at least about 28, at least about 29, at least about 30, at least about 32, at least about 34, about 36, at least about 40, at least about 45, at least about 50, at least about 55, at least about 60, at least about 65, at least about 70, at least about 75, at least about 80, at least about 85, at least about 90, at least about 95, or at least about 100. That is to say that the compound of Formula (1) may be from a linear, saturated fatty alcohol and at least about 25 or more, at least about 36, at least about 40, at least about 45, at least about 50, at least about 55, at least about 60, at least about 65, at least about 70, at least about 75, at least about 80, at least about 85, at least about 90, at least about 95, at least about 100 moles of ethylene oxide per mole of alcohol.

The integer represented by 'x' may be an integer having a value of from about 25 to about 100, from about 36 to about 100, from about 36 to about 80, from about 40 to about 80, from about 45 to about 80, from about 50 to about 80, from about 55 to about 80, from about 60 to about 80, from about 65 to about 80, from about 70 to about 80, from about 75 to about 80, or about 80. That is to say that the compound of Formula (1) may be from a linear, saturated fatty alcohol and from about 25 to about 100, from about 36 to about 100, from about 36 to about 80, from about 40 to about 80, from about 45 to about 80, from about 50 to about 80, from about 55 to about 80, from about 60 to about 80, from about 65 to about 80, from about 70 to about 80, from about 75 to about 80, or about 80 moles of ethylene oxide per mole of alcohol.

The integer represented by 'x' may have a value of about 25, about 36, about 50 or about 80. That is to say that the compound of Formula (1) may be from a linear, saturated fatty alcohol and about 25 moles, about 36 moles, about 50 moles, or about 80 moles of ethylene oxide per mole of alcohol.

A compound of Formula (1) may be present in an amount of at least 1, 2, 3, 3.3, 4, 5, 6, 7, 8, 9, 10, 12, 14, 16, 18 or at least 20% wt. of the detergent gel composition. The compound of Formula (1) may be present in an amount of no more than 25, 20, 17.5, 15, 12.5, 10, 9, 8, 7, 6, 5, 4, 3, 2 or no more than 1% wt. The compound of Formula (1) may be present in an amount between about 1.0 and about 20% wt., between about 2.0 and about 20% wt., between about 2.0 and about 18% wt., between about 3.0 and about 16% wt., between about 3.3 and about 15% wt., between about 4.0 and about 14% wt., between about 5.0 and about 12% wt., between about 6.0 and about 10% wt. between about 6.5 and about 9% wt., between about 7.0 and about 8% wt., or about 7.5% wt., based on the weight of the detergent gel composition.

The detergent gel composition may comprise trisodium citrate.

The detergent gel composition may comprise citrate in an amount of at least 10, 15, 20, 25, 30, 35, 40, or at least 45% wt. of the composition. The detergent gel composition may comprise citrate in an amount between about 10 and about 80% wt. between about 15 and about 75% wt., between about 20 and about 70% wt., between about 25 and about 65% wt., between about 30 and about 60% wt., between about 35 and about 55% wt., between about 40 and about 50% wt., between about 42 and 48% wt., between about 44 and 47% wt., or about 46% wt., based on the weight of the detergent gel composition. The detergent gel composition may comprise citrate in an amount between about 10 and about 30 wt. %, between about 12.5 and about 27.5% wt. between about 15 and about 25% wt., between about 17.5 and about 22.5% wt., or about 20% wt., based on the weight of the detergent gel composition. The citrate may comprise trisodium citrate.

According to a second aspect of the invention, there is provided the use of a packaged detergent gel composition according to the first aspect of the invention for washing soiled kitchenware, hard surface cleaning, laundry cleaning or fabric treatment.

The kitchenware may comprise tableware, such as, for example, crockery, cutlery and the like.

The invention according to the second aspect may optionally include any of the features of the invention according to the first aspect.

According to a third aspect of the invention, there is provided a method for washing kitchenware in an automatic dishwashing machine, wherein a packaged detergent gel composition of the first aspect of the invention is added to the automatic dishwashing machine. The packaged detergent gel composition may be added to the automatic dishwashing machine at the start of a main wash cycle or at the start of a pre-wash cycle. The packaged detergent gel composition may be added to a dosing basket or a dosing chamber within the automatic dishwashing machine. The packaged detergent gel composition may be placed on a floor of the automatic dishwashing machine.

The invention according to the third aspect may optionally include any of the optional features of the invention according to the first aspect.

According to a fourth aspect of the invention, there is provided a method for preparing a packaged detergent gel composition according to the invention in its first aspect, the method comprising the steps of:

a) mixing a liquid component of the detergent composition with at least one fatty alcohol ethoxylate;
b) cooling the composition formed by step b) to form a gel; and c) packaging the composition in a water-soluble container.

Advantageously, during step a), the liquid component reaches a temperature of around 55-65° C. without any external heating. Beneficially, such temperature is sufficient to melt the at least one fatty alcohol ethoxylate added in step a). As such, the method according to the fourth aspect of the invention does not require any external heating to sufficiently mix the components and at least one fatty alcohol ethoxylate added, or to melt any solid components which may be added.

Preferably the liquid component is formed by mixing two or more liquids.

The first liquid component and the second liquid component may be mixed at a speed between about 200 and about 1500 rpm. The first liquid component and the second liquid component may be mixed at a speed up to 200, 300, 400, 500, 600, 700, 800, 900, 1000, 1100, 1200, 1300, 1400, or up to 1500 rpm.

Before addition of the fatty alcohol ethoxylate to any mixed liquid component the mixed liquid component may be homogenised. The homogenisation may comprise mixing the mixed liquid component for between about 0.5 and 5 minutes, between about 1 and about 4 minutes, between about 1.5 and about 3 minutes, or about 2 minutes. The homogenisation may be carried out at up to 200, 300, 400, 500, 600, 700, 800, 900, 1000, 1100, 1200, 1300, 1400, or up to 1500 rpm.

Step a) may further comprise adding one or more solid cleaning actives to the liquid. The solid cleaning actives may be one or more of the groups comprising an anti-corrosion protection agent, a bleach booster and a builder. The anti-corrosion protection agent may be a silver corrosion protection agent, for example tolyl triazole. The bleach booster may be TAED. The builder may be trisodium citrate.

Step a) may comprise mixing a mixed liquid component with at least one fatty alcohol ethoxylate at a speed of up to 200, 300, 400, 500, 600, 700, 800, 900, 1000, 1100, 1200, 1300, 1400, 1500, 1750, 2000, 2250, 2500, 2750 or up to 3000 rpm.

Before step b), the composition formed by step a) may be homogenised. The homogenisation may comprise mixing the composition formed by step a) for between about 1 and 20 minutes, between about 2 and about 18 minutes, between about 4 and about 16 minutes, between about 6 and about 14 minutes, between about 8 and about 12 minutes, or about 10 minutes. The homogenisation may be carried out at up to 200, 300, 400, 500, 600, 700, 800, 900, 1000, 1100, 1200, 1300, 1400, 1600, 1800, 2000, 2200, or up to 2400 rpm.

In step b), the composition formed by step a) may be cooled to below 30° C., 28° C., 26° C., 24° C., 22° C., 20° C., 18° C., or below 16° C. The composition may preferably be cooled to room temperature, i.e. around 20-22° C.

The first liquid component may be a surfactant. The surfactant may be a fatty alcohol alkoxylate having an EO:PO ratio of around 2:1, for example.

The second liquid component may be an antifoaming agent.

In step a), the at least one fatty alcohol ethoxylate may be added in the form of a solid, preferably in the form of a powdered solid.

An enzyme, such as an amylase and/or protease may be mixed with the detergent gel composition; which may, for example, be either during or after cooling in step b).

The water-soluble container of step c) may be as described hereinabove for the other aspects of the invention, and may for example, comprise a water-soluble film, preferably a water-soluble PVOH film. The container may comprise a thermoformed water-soluble film. The container may comprise a multi-compartment container, in which the detergent gel composition of step b) is located in at least one compartment and at least one further detergent composition is located in at least one further compartment.

The fatty alcohol ethoxylate in step a) may comprise a compound of the formula:

$$R—O(CH_2CH_2O)_xH \qquad \text{(Formula (1))}$$

wherein,

R is a linear, saturated fatty alcohol, and x is an integer having a value of at least 25.

The invention according to the fourth aspect may optionally include any of the optional features of the invention according to the first aspect of the invention.

According to a fifth aspect of the invention there is provided a detergent gel composition comprising a fatty alcohol ethoxylate of formula:

$$R—O(CH_2CH_2O)_xH \qquad \text{(Formula (1))}$$

wherein,

R is a linear, saturated fatty alcohol, and x is an integer having a value of at least 25;

wherein the detergent gel composition further comprises at least one builder selected from the group consisting of hydroxycarboxylates, aminocarboxylates, phosphates, or the salts thereof;

and wherein the detergent gel composition further comprises at least one mixed alkoxylate fatty alcohol non-ionic surfactant.

Cleaning Actives

Any traditional cleaning ingredients may be used as part of the detergent gel composition, or any further compositions located in any compartment of a multi-compartment container. The levels given are weight percent and refer to the total composition (excluding the water-soluble container). The detergent gel composition may be free of phosphate builder and comprise one or more detergent active components which may be selected from surfactants, alkalinity sources, acidity sources, enzymes, polymers, anti-corrosion agents and care agents.

In some embodiments, the water-soluble container is a multi-compartment water-soluble container comprising a first compartment comprising the detergent gel composition, and a second compartment comprising any traditional cleaning ingredients in solid or liquid form.

In some embodiments, the water-soluble container is a multi-compartment water-soluble container comprising a first compartment comprising the detergent gel composition, a second compartment comprising cleaning ingredients in solid form, and a third compartment comprising cleaning ingredients in liquid form. Although the following components are stated as being optional components of the detergent gel composition they may also, or alternatively, be present in any composition in the second or subsequent compartments of a multi-compartment container.

Builder

The detergent gel composition may comprise any ingredients known in the art. The detergent gel composition comprises a builder. The builder may be a phosphate-free builder. In many countries, including the United States and in the European Union, phosphate builders are restricted or the amount of phosphate permitted in a detergent composition has been severely limited. Therefore, in preferred embodiments, the detergent gel compositions are substantially phosphate-free.

The builder comprises one or more small molecule builders selected from hydroxycarboxylates (such as a citrate salt, for example trisodium citrate, which may be anhydrous), aminocarboxylates (such as methyl glycine diacetic acid (MGDA), or N,N-dicarboxymethyl glutamic acid (GLDA), dicarboxylic acid amines (such as iminodisuccinic acid (IDS)) and/or phosphates (such as tripolyphosphate), or the salts thereof.

The builder may be present in an amount of greater than 10% wt., 15% wt., 20% wt., 25% wt., 30 wt. %, 35% wt., 40% wt., 45% wt., or greater than 50% wt. The builder may be present in an amount between about 31 and about 49 wt. %, between about 32 and about 41% wt., or between about 33 and about 39% wt.

The builder may be present in an amount up to about 0.1% wt., about 0.2% wt. about 0.3% wt., about 0.4% wt., about 0.5% wt., about 0.6% wt., about 0.7% wt., about 0.8% wt., about 0.9% wt., about 1% wt., about 1.5% wt., about 2% wt., about 3% wt. about 4% wt., about 5% wt., about 6% wt., about 7% wt., about 8% wt., about 9% wt. or up to about 10% wt.

The actual amount used in the detergent gel composition may depend upon the nature of the builder used.

The builder may be an organic builder.

The detergent gel composition may comprise a secondary builder (co-builder), for example a phosphonate or a polymer.

Polymer

The detergent gel composition may comprise at least one polymer, preferably at least one polycarboxylate. By the term 'polycarboxylate', we mean any polymeric species comprising a carboxylic acid or carboxylate groups available for chelation. The polycarboxylate polymer may be a homopolymer and/or a copolymer and/or a terpolymer.

The one or more polymer may be present in an amount of between about 3 and about 25% wt., between about 5 and about 20% wt., between about 6 and about 18% wt., between about 7 and about 16% wt., between about 8 and about 15% wt., or between about 9 and about 13% wt.

The polymer may be a polycarboxylate polymer comprising an itaconic acid copolymer.

The polymer may be a polycarboxylate polymer comprising an acrylic acid monomer.

The polymer may be a polycarboxylate polymer comprising an acrylic acid homopolymer. The homopolymer may have a molecular weight of between about 2,000 and about 10,000, between about 3,000 and about 9,000, or between about 4,000 and about 8,000. The homopolymer may be present in an amount of from about 0.1 to about 5% wt., from about 0.2 to about 4.5% wt., from about 0.3 to about 4% wt., from about 0.3 to about 3.5% wt., from about 0.4 to about 3% wt., from about 0.5 to about 2.5% wt., from about 0.6 to about 2% wt., or from about 0.7 to about 1.5% wt.

The at least one polycarboxylate may comprise a sulphonic acid monomer. The sulphonic acid monomer may be present in an amount of from about 4 to about 14% wt., from about 5 to about 13% wt., from about 6 to about 12% wt. or from about 7 to about 11% wt.

Preferred monomers containing sulphonic acid groups are those of the formula:

$R^1(R^2)C{=}C(R^3){-}X{-}SO_3H$ in which $R^1$ to $R^3$ mutually independently denote —CH3, a straight-chain or branched saturated alkyl residue with 2 to 12 carbon atoms, a straight-chain or branched, mono- or polyunsaturated alkenyl residue with 2 to 12 carbon atoms, alkyl or alkenyl residues substituted with —NH2, —OH or —COOH, or denote —COOH or —$COOR^4$, $R^4$ being a saturated or unsaturated, straight-chain or branched hydrocarbon residue with 1 to 12 carbon atoms, and X denotes an optionally present spacer group which is selected from —$(CH_2)$n- with n=0 to 4, —COO—$(CH_2)$k- with k=1 to 6, —C(O)—NH—$C(CH_3)_2$— and $CH(CH_2CH_3)$—.

Preferred monomers of the above formula include, for example, those of the formulae:

$H_2C{=}CH{-}X{-}SO_3H$ $H_2C{=}C(CH_3){-}X{-}SO_3H$ $HO_3S{-}X{-}(R^5)C{=}C(R^6){-}X{-}SO_3H$ in which $R^5$ and $R^6$ are mutually independently selected from —H, —$CH_3$, —$CH_2CH_3$, —$CH_2CH_2CH_3$, —$CH(CH_3)_2$ and X denotes an optionally present spacer group which is selected from —$(CH_2)$n- with n=0 to 4, —COO—$(CH_2)$k with k=1 to 6, —C(O)—NH—$C(CH_3)_2$— and —C(O)—NH—$CH(CH_2CH_3)$—.

Preferred monomers containing sulphonic acid groups are here 1-acrylamido-1-propanesulphonic acid, 2-acrylamido-2-propanesulphonic acid, 2-acrylamido-2-methyl-1-propanesulphonic acid, 2-methacrylamido-2-methyl-1-propanesulphonic acid, 3-methacrylamido-2-hydroxypropanesulphonic acid, allylsulphonic acid, methallylsulphonic acid, allyloxybenzenesulphonic acid, methallyloxybenzenesulphonic acid, 2-hydroxy-3-(2-propenyloxy)propanesulphonic acid, 2-methyl-2-propene-1-sulphonic acid, styrenesulphonic acid, vinylsulphonic acid, 3-sulphopropyl acrylate, 3-sulfopropyl methacrylate, sulphomethacrylamide, sulphomethylmethacrylamide and mixtures of the stated acids or the water-soluble salts thereof. Particularly preferred is 2-acrylamido-2-methyl-1-propanesulphonic acid.

The sulphonic acid groups may be present in the polymers entirely or in part in neutralized form, i.e. the acidic hydrogen atom of the sulphonic acid group may be replaced in some or all of the sulphonic acid groups with metal ions, preferably alkali metal ions and in particular with sodium ions. It is preferred according to the invention to use copolymers containing partially or completely neutralized sulphonic acid groups.

The molar mass of the sulphonic acid polymers may be varied in order to tailor the properties of the polymers to the desired intended application. The copolymers may have a molar mass of between about 2000 and about 200,000 g $mol^{-1}$, between about 4000 and about 25,000 g $mol^{-1}$, or between about 5000 and about 15,000 g $mol^{-1}$. The polymer preferably has a pH of from 3 to 5, such as from 3.5 to 4.5.

The polycarboxylate may be a copolymer comprising a sulphonic acid monomer and an acrylic acid monomer.

The at least one polycarboxylate comprises a maleic acid monomer. Such a polymer is preferably present in an amount of from about 0.1 to about 5 wt., from about 0.2 to about 4.5% wt., from about 0.3 to about 4% wt., from about 0.3 to about 3.5% wt., from about 0.4 to about 3% wt., from about 0.5 to about 2.5% wt., from about 0.6 to about 2%, or from about 0.7 to about 1.5% wt.

The polymer may have a viscosity of from about 500 to about 3000 mPa·s, from about 750 to about 2500 mPa·s, from about 1000 mPa·s to about 2000 mPa·s. Such a copolymer may have a molecular weight (Mw) of from about 10,000 to about 100,000 g $mol^{-1}$, from about 20,000 to about 80,000 g $mol^{-1}$, from about 30,000 to about 70,000 g $mol^{-1}$, or from about 45,000 to about 55,000 g $mol^{-1}$.

The polycarboxylate may be a copolymer comprising a maleic acid monomer and an acrylic acid monomer.

The acrylic acid-maleic acid copolymer may be formed from 2-propenoic acid and 2,5-furandione. The acrylic acid-maleic acid copolymer may have a pH of from 7 to 9, such as from 7.5 to 8.5, assessed by DIN19268.

The polymer may be an acrylic acid homopolymer, an acrylic acid-sulphonic acid, and/or an acrylic acid-maleic acid copolymer.

The polymer may comprise one or more polycarboxylate homopolymers and one or more polycarboxylate copolymers. The homopolymer(s) and copolymer(s) may be present in a ratio of from 1:20 to 1:2, preferably from 1:15 to 1:5.

The polymer may comprise polyepoxysuccinic acid (PESA) or derivatives thereof. Polyepoxysuccinic acid is also known as epoxysuccinic acid homopolymer, polyoxirane-2,3-dicarboxylic acid, 2,3-oxiranedicarboxylic acid homopolymer, or poly(1-oxacyclopropane-2,3-dicarboxylic acid); and has the general structure:

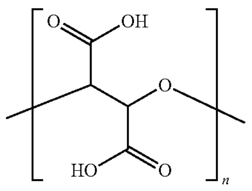

and where the derivatives thereof have the general structure:

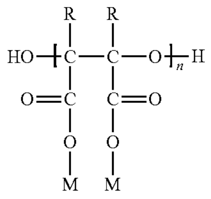

where R may be hydrogen or any organic chain (but preferably an ester such as $C_{1-4}$ alkyl) and where M may be any cation (preferably $Na^+$, $H^+$, $K^+$, and/or $NH_4^+$).

All references to PESA hereafter are to be taken to refer to polyepoxysuccinic acid or derivatives thereof, unless otherwise stated.

The PESA may have a molecular weight (Mw) of from about 100 to about 10,000 g $mol^{-1}$, from about 400 to about 2000 g $mol^{-1}$, from about 1000 to about 1800 g $mol^{-1}$. The PESA may have from about 2 to about 100 repeating monomer units, such as from about 2 to about 50, about 2 to about 45, about 2 to about 20 or from about 2 to about 10 repeating monomer units.

The polymer may comprise PESA in an amount of from about 0.1 to about 5% wt., from 0.1 about to about 4% wt., from about 0.15 to about 3% wt., from about 0.2 to about 1.9% wt., from about 0.25 to about 1.5% wt., or from about 0.6 to about 1.1% wt. PESA is preferably present in an amount of from about 5 to about 20% wt., from about 8 to about 19% wt., or from about 9 to about 15% wt., relative to the total quantity of polymers present.

The polymer may comprise any biodegradable polymer.

The biodegradable polymer may comprise, for example, Alcoguard® H 5941.

The biodegradable polymer may comprise a bio-based carbohydrate backbone, for example starch, cellulose or inulin. The polymer may comprise one or more synthetic, fossil-based grafting group.

The polymer may be a cationic, anionic or amphoteric polymer.

Surfactant

The detergent gel composition includes one or more surfactant(s) in addition to the fatty alcohol ethoxylate of the present invention. Any of non-ionic, anionic, cationic, amphoteric or zwitterionic surface active agents or suitable mixtures thereof may be used. Many such suitable surfactants are described in Kirk Othmer's Encyclopedia of Chemical Technology, 3rd Ed., Vol. 22, pp. 360-379, "Surfactants and Detersive Systems", incorporated by reference herein. Preferably, bleach-stable surfactants may be used.

In the case of automatic dishwashing compositions, it is preferred to minimise the amount of anionic surfactant. Accordingly, preferably the composition comprises no more than about 5% wt., no more than about 4% wt., no more than about 3% wt., no more than about 2% wt., no more than about 1% wt., or no, or substantially none, anionic surfactant. Preferably the composition comprises no more than about 5% wt. no more than about 4% wt., no more than about 3% wt., no more than about 2% wt., no more than about 1% wt., or no, or substantially none, ionic surfactant of any type.

Non-ionic surfactants are preferred for automatic dishwashing products. The composition may comprise from about 5 to about 25% wt., from about 10 to about 20% wt., from about 11 to about 19% wt., from about 12 to about 18% wt., from about 13 to about 17% wt., from about 14 to about 16% wt., or about 15% wt. of one or more non-ionic surfactants.

The non-ionic surfactant may be an optionally end capped alkyl alkoxylate. A preferred class of non-ionic surfactants are ethoxylated non-ionic surfactants prepared by the reaction of a monohydroxy alkanol or alkyl phenol with 6 to 20 carbon atoms. Preferably the surfactants have at least 12 moles per mole of alcohol or alkyl phenol. Particularly preferred non-ionic surfactants are the non-ionics from a linear chain fatty alcohol with 10-20 carbon atoms and at least 5 moles of ethylene oxide per mole of alcohol. The non-ionic surfactant may comprise propylene oxide (PO) units in the molecule. The PO units may constitute up to 40% wt., 35% wt., 30% wt., 25% wt., 20% wt. or up to 15% wt. of the overall molecular weight of the non-ionic surfactant.

The detergent gel composition comprises one or more non-ionic surfactants comprising a mixed alkoxylate fatty alcohol non-ionic surfactant, preferably comprising a greater number of moles of the lower alkoxylate group than of the higher alkoxylate group in the molecule. Preferably the mixed alkoxylate fatty alcohol non-ionic surfactant comprises at least two of ethoxylate (EO), propoxylate (PO) or butoxylate (BO) groups and most preferably only EO and PO groups.

By the term 'higher alkoxylate' it is meant the alkoxylate group having the greatest number of carbon atoms in that alkoxylate group. By the term 'lower alkoxylate' it is meant the alkoxylate group having the lowest number of carbon atoms in that alkoxylate group. Thus, for a mixed alkoxylate fatty alcohol comprising EO and PO groups, the EO is the lower alkoxylate and the PO is the higher alkoxylate. Thus, the detergent compositions of the invention comprise mixed alkoxylate fatty alcohols comprising a greater number of EO groups than PO groups. The same applies to other mixed alkoxylates such as those containing EO and BO or even PO and BO groups.

The mixed alkoxylate fatty alcohol non-ionic surfactant preferably has a mole ratio of the lower alkoxylate group to the higher alkoxylate group is at least 1.1:1, most preferably of at least 1.8:1, especially at least 2:1. It is also preferred that the mixed alkoxylate fatty alcohol non-ionic surfactant comprises between 3 to 5 moles of the higher alkoxylate group and between 6 to 10 moles of the higher lower group, preferably 4 or 5 moles of PO and 7 or 8 moles of EO and most preferably 4 moles of PO and 8 moles of EO.

Preferably the mixed alkoxylate fatty alcohol non-ionic surfactant has 12-18 carbon atoms in the alkyl chain.

The mixed alkoxylate fatty alcohol non-ionic surfactant may comprise at least two of EO, PO or BO groups and especially a mixture of EO and PO groups, preferably EO and PO groups only.

The mole ratio of the lower alkoxylate group to the higher alkoxylate group may be at least 1.1:1, more preferably at least 1.5:1, and most preferably at least 1.8:1, such as at least 2:1 or at least 3:1.

The mixed alkoxylate fatty alcohol non-ionic surfactant may comprise between 3 to 5 moles of the higher alkoxylate group and between 6 to 10 moles of the lower group, or 4 or 5 moles of the higher alkoxylate group and 7 or 8 moles of the lower alkoxylate group. The mixed alkoxylate fatty alcohol non-ionic surfactant may have 4 or 5 PO moles and 7 or 8 EO moles, or 4 PO moles and 8 EO moles.

The mixed alkoxylate fatty alcohol non-ionic surfactant may be C12-15 8EO/4PO.

Surfactants of the above type which are ethoxylated mono-hydroxy alkanols or alkylphenols which additionally comprise poly-oxyethylene-polyoxypropylene block copolymer units may be used. The alcohol or alkylphenol portion of such surfactants constitutes more than 30%, more than 40%, more than 50%, more than 60%, or more than 70% by weight of the overall molecular weight of the non-ionic surfactant.

The mixed alkoxylate fatty alcohol non-ionic surfactants used in the compositions of the invention may be prepared by the reaction of suitable monohydroxy alkanols or alkylphenols with 6 to 20 carbon atoms. Preferably the surfactants have at least 8 moles, particularly preferred at least 10 moles of alkylene oxide per mole of alcohol or alkylphenol.

The liquid mixed alkoxylate fatty alcohol non-ionic surfactants may be one or more of those from a linear chain fatty alcohol with 12-18 carbon atoms, preferably 12 to 15 carbon atoms, and at least 10 moles, or at least 12 moles of alkylene oxide per mole of alcohol.

When PO units are used, they preferably constitute up to 25% by weight, preferably up to 20% by weight and still more preferably up to 15% by weight of the over-all molecular weight of the non-ionic surfactant.

The mixed alkoxylate fatty alcohol non-ionic surfactants, in particular, the C12-15 fatty alcohol 8EO,4PO surfactant, exhibit: excellent wetting of plastic, glass, ceramic and stainless steel; excellent temperature stability up to 90° C. for processing; good compatibility with thickeners typically used in the detergent compositions (e.g. PEG); and stability in alkaline conditions.

Alternatively or in addition, glucamide surfactants prepared from sugars and natural oils, may be used. A preferred example is oleyl glucamide. Also suitable are alkyl polyglycosides (APGs), which are plant-derived from sugars, these surfactants are usually glucose and fatty alcohol derivatives.

The use of a mixture of any of the aforementioned nonionic surfactants is suitable in compositions of the present invention.

Enzyme

The composition may include one or more enzymes. It is preferred that the one or more enzymes are selected from protease, lipase, amylase, cellulase and peroxidase, with protease and amylase being most preferred. It is most preferred that protease and/or amylase enzymes are included in the compositions according to the invention as such enzymes are especially effective in dishwashing detergent compositions. More than one species of enzyme may be used. The total quantity of enzymes may be from about 1 to about 5% wt., from about 2 to about 4% wt., or about 3% wt.

The one or more enzyme may be present in an amount from about 1 to about 40% wt., from about 2 to about 38% wt., from about 4 to about 36% wt., from about 6 to about 34% wt., from about 8 to about 32% wt., from about 10 to about 30% wt., from about 12 to about 28% wt., from about 14 to about 26% wt., from about 16 to about 24% wt., from about 18 to about 24% wt. from about 20 to about 24% wt., from about 22 to about 24% wt., or about 23% wt. based on the weight of the detergent gel composition.

The one or more enzyme may be present in an amount of at least 1, 2, 3, 4, 5, 6, 7, 8, 9, 10, 12, 14, 16, 18, 20, 22, 24, or at least 25% wt. based on the weight of the detergent composition.

The composition may comprise protease in an amount from about 1 to about 40% wt., from about 2 to about 38% wt., from about 4 to about 36% wt., from about 6 to about 34% wt., from about 8 to about 32% wt., from about 10 to about 30% wt., from about 12 to about 28% wt., from about 14 to about 26% wt., from about 16 to about 25% wt., from about 18 to about 25% wt. from about 20 to about 25% wt., from about 21 to about 24% wt., from about 22 to about 24% wt., or about 23% wt. based on the weight of the detergent gel composition.

The composition may comprise amylase in an amount be from about 1 to about 10% wt., from about 2 to about 8% wt., from about 4 to about 6% wt. or about 5% wt.

Bleaching Agents

The composition may include a bleaching system comprising one or more bleaching agents, preferably in combination with one or more bleach activators and/or one or more bleach catalysts. The one or more bleaching agent is preferably selected from the group consisting of an oxygen-releasing bleaching agent, a chlorine-releasing bleaching agent and mixtures thereof.

The bleaching agent may comprise the active bleach species itself or a precursor to that species. The bleaching agent may be selected from the group consisting of an inorganic peroxide, an organic peracid and mixtures thereof. The terms "inorganic peroxide" and "organic peracid" encompass salts and derivatives thereof. Inorganic peroxides include percarbonates, perborates, persulphates, hydrogen peroxide and derivatives and salts thereof. The sodium and potassium salts of these inorganic peroxides are suitable, especially the sodium salts. Sodium percarbonate is particularly preferred.

The active bleaching agent is preferably present in an amount of from about 5 to about 25% wt., from about 7 to about 23% wt., from about 9 to about 19% wt., or from about 11 to about 17% wt.

The composition may further comprise one or more bleach activators and/or bleach catalysts. Any suitable bleach activator may be included, for example Tetraacetylethylenediamine (TAED), if this is desired for the activation of the bleaching agent. Any suitable bleach catalyst may be used, for example manganese acetate or dinuclear manganese complexes such as those described in EP 1741774 A1, the contents of which are incorporated herein by reference. The organic peracids such as perbenzoic acid and peroxycarboxylic acids e.g. phthalimidoperoxyhexanoic acid (PAP) do not require the use of a bleach activator or catalyst as these bleaches are active at relatively low temperatures such as about 30° C.

The bleach catalyst may be a manganese complex comprising 1,4,7-Triazacyclononane (TACN), or any derivatives of a TACN ligand, for example 1,4,7-trimethyl-TACN, manganese oxalate, manganese acetate or a dinuclear manganese complex, for example a dinuclear manganese complex comprising TACN or any derivatives of a TACN ligand, for example 1,4,7-trimethyl-TACN.

Anti-Corrosion Agent

The composition may comprise silver and/or copper corrosion inhibitors. Preferred silver/copper corrosion inhibitors are benzotriazole (BTA) or bis-benzotriazole and substituted derivatives thereof. Other suitable inhibitors are organic and/or inorganic redox-active substances and paraffin oil. Benzotriazole derivatives are those compounds in which the available substitution sites on the aromatic ring are partially or completely substituted. Suitable substituents are linear or branch-chain Cl-20 alkyl groups and hydroxyl, thio, phenyl or halogen such as fluorine, chlorine, bromine and iodine. A preferred substituted benzotriazole is tolyltriazole.

The detergent gel composition may comprise an anti-corrosion agent in an amount of from 0.01% by weight to 5% by weight, 0.05% by weight to 3% by weight, 0.1% by weight to 2.5% by weight, or 0.2% by weight to 2% by weight, based on the total weight.

Figure 2:
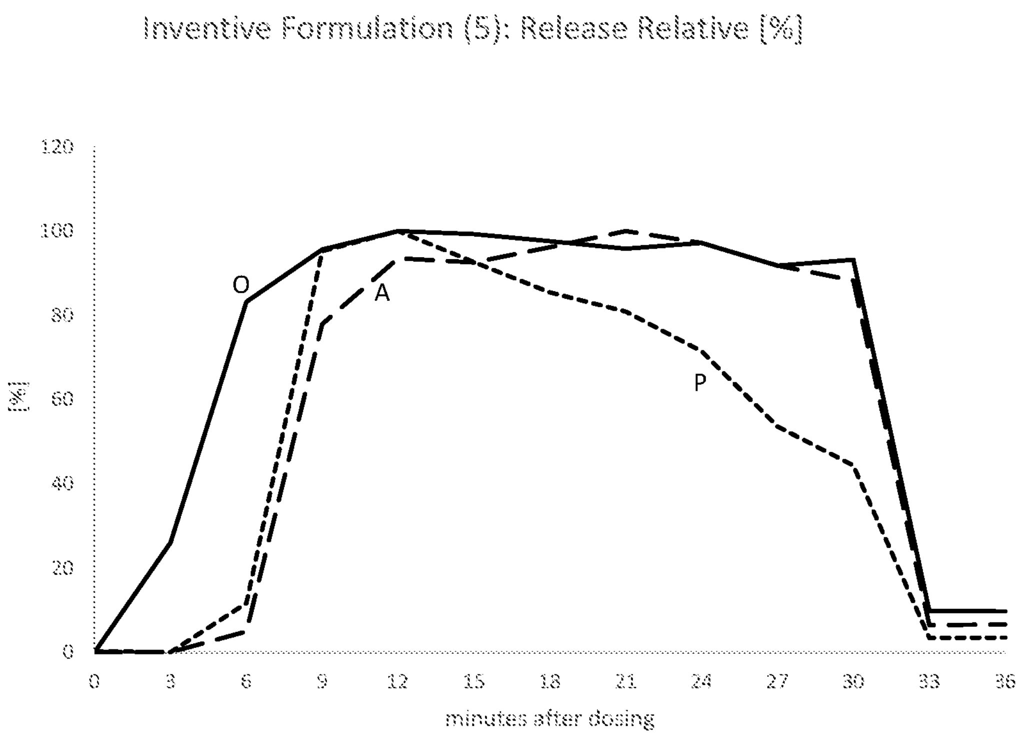

In order that the invention may be more clearly understood, one or more embodiments thereof will now be described, by way of example only, with reference to the accompanying drawings, of which:

FIG. 1 is a graph showing the relative release of protease and amylase enzymes, and active oxygen, of a comparative formulation in Example 5 and FIG. 2 is a graph showing the relative release of protease and amylase enzymes, and active oxygen, of an inventive formulation in Example 5.

EXAMPLES

Example 1—Storage Trial

Example 1 was carried out using a fatty alcohol ethoxylate having the following formula (Compound (1)):

$$R—O(CH_2CH_2O)_xH$$

wherein,

R is a linear, saturated $C_{16}$-$C_{18}$ fatty alcohol, and x is 25.

Two compositions, Comparative Formulation (1), which contained no Compound (1) and was not in gel format, and Inventive Formulation (1), which was in gel format and contained an example of a compound of Formula (1) in the form of Compound (1), were prepared according to the following formulations:

| Ingredient | Function | Comparative Formulation (1)/% wt. | Inventive Formulation (1)/% wt. |
|---|---|---|---|
| Trisodium Citrate | Builder | 42.9 | 46.0 |
| Fatty Alcohol Alkoxylate, EO:PO of 2:1 | Surfactant | 32.0 | 31.4 |
| Compound (1) | Surfactant | — | 7.5 |
| Polyalkylene glycol pentaerythritol, EO:PO of 4:1 | Thickener | 10.0 | — |
| Other ingredients | Care agents, Antifoamer and Bleach booster | 15.1 | 15.1 |

Inventive Formulation (1) and Comparative Formulation (1) were in the form of a gel.

Notably, replacing polyalkylene glycol pentaerythritol, EO:PO of 4:1, with Compound (1), a pure fatty alcohol ethoxylate, allowed an increased amount of trisodium citrate to be present in the detergent gel composition.

Inventive Formulation (1) and Comparative Formulation (1) were prepared and each placed in two separate storage trials.

Storage Trial 1:

Temperature: 30° C.

Relative humidity: 65%

Duration: 12 weeks

Storage Trial 2:

Temperature: 40° C.

Relative humidity: 75%

Duration: 12 weeks

In each trial, Inventive Formulation (1) shows an improved stability profile compared to Comparative Formulation (1). By 'improved stability profile', it is meant that there is no perceptible discolouration of the detergent gel composition, no phase separation or no significant phase separation, over this timescale. The storage stability is measured by filling a PVOH pouch with the detergent composition, sealing the pouch, and storing the sealed pouch in a sealed doy pack in a climate chamber under the aforementioned conditions.

In further examples, higher ethoxylated congeners of Compound (1) were used. Compound (2), Compound (3) and Compound (4) (as described below) were each used instead of Compound (1) of Inventive Formulation (1) and the results of testing showed that these fatty alcohol ethoxylates with an EO content of 36, 50 and 80, respectively, also displayed improved stability performance compared to Comparative Formulation (1).

This shows that a compound of Formula (1), in the form of Compound (1), (2), (3) or (4), can be used to replace polyalkylene glycols (typically, a thickening-only ingredient) in a detergent gel composition and the stability of the detergent gel composition (Inventive Formulation (1) in the case of Compound (1)) is greater than that of a conventional detergent composition comprising polyalkylene glycols. As such, Inventive Formulation (1) maintains an aesthetically pleasing profile for a longer duration, and does not undergo phase separation as readily, if at all, compared to Comparative Formulation (1). It should be noted that the replacement of polyalkylene glycols, which have no surfactant functionality, with compounds of Formula (1), which have surfactant functionality, also enables the replacement of a non-functional filler ingredient with a detergent active ingredient.

Example 2—Shine Test

The test was carried out using liquid ballast soil to simulate soiled kitchenware. A beaker with 16 g defrosted soil was placed in a top basket of the dishwasher at the beginning of each test.

Scoring (with Respect to Shine Loss Characteristic):

5—Extremely strong
4—Very strong
3—Strong
2—Slight
1—None

| | |
|---|---|
| Machine Type | Bosch |
| Program | Eco |
| Water Hardness | 21°GH |
| Evaluation | after 5 washing cycles |

| | Parameter | Comparative Formulation (1) | Inventive Formulation (1) |
|---|---|---|---|
| Short term shine (5 cycles) | Glass spotting | 2.1 | 2.0 |
| | Glass filming | 3.4 | 3.9 |
| | Cutlery spotting | 2.0 | 2.0 |
| | Cutlery Filming | 2.5 | 2.5 |

1.0 = Most favourable, 5.0 = Least favourable

A difference of ≥1.0 score on filming is considered distinctive.

The evaluators noted no noticeable change to the dishwasher, e.g. no discoloration of the interior or the baskets and no accumulation of residues or precipitates on the filter.

Each test product was visually examined.

It is observed that the Inventive Formulation (1) exhibits parity in shine performance compared to Comparative Formulation (1).

Example 3—Phase Separation and Dissolution Profile of Unit Dose Detergent Gel Compositions Example 3 was carried out using higher ethoxylated congeners compounds of Formula (1) e.g.:

$$R—O(CH_2CH_2O)_xH \quad \text{Compound (2)}$$

wherein,

R is a linear, saturated $C_{16}$-$C_{18}$ fatty alcohol, and x is 36.

$$R—O(CH_2CH_2O)_xH \quad \text{Compound (3)}$$

wherein,

R is a linear, saturated $C_{16}$-$C_{18}$ fatty alcohol, and x is 50.

$$R—O(CH_2CH_2O)_xH \quad \text{Compound (4)}$$

wherein,

R is a linear, saturated $C_{16}$-$C_{18}$ fatty alcohol, and x is 80.

Formulations were prepared using Compounds (3) and (4) as unit-dose detergent gel compositions in water-soluble PVOH containers, as follows (the table below shows the gel phase only of the formulations):

| Ingredient | Function | Comparative Formulation (1)/% wt. | Inventive Formulation (1)/% wt. | Inventive Formulation (3)/% wt. | Inventive Formulation (4)/% wt. |
|---|---|---|---|---|---|
| Trisodium Citrate | Builder | 42.9 | 46.0 | 46.0 | 46.0 |
| Fatty Alcohol Alkoxylate, EO:PO of 2:1 | Surfactant | 32.0 | 31.4 | 31.4 | 31.4 |
| Compound (1) | Surfactant | — | 7.5 | — | — |
| Compound (3) | Surfactant | — | — | 7.5 | — |
| Compound (4) | Surfactant | — | — | — | 7.5 |
| Polyalkylene glycol pentaerythritol, EO:PO of 4:1 | Thickener | 10.0 | — | — | — |
| Other ingredients | Care agent, Antifoamer, Bleach booster and Colorants | 15.1 | 15.1 | 15.1 | 15.1 |

Inventive Formulations (3) and (4) were in the form of a gel. Inventive Formulations (3) and (4) were each comprised in a multi-compartment package comprising a water-soluble PVOH film container. The multi-compartment package comprising Inventive Formulation (3) or (4) comprised a first compartment comprising a gel comprising Inventive Formulation (3) or (4) and added enzymes protease and amylase, and a second compartment comprising a bleaching system in the form of a powdered solid. The second compartment further comprised additional cleaning actives, for example alkalinity agents, co-builders and buffering agents, each in the form of a solid.

| | Comparative Formulation (1) | Inventive Formulation (1) | Inventive Formulation (3) | Inventive Formulation (4) |
|---|---|---|---|---|
| Phase Separation/° C. | Room temperature | ca. 37° C. | ca. 45° C. | ca. 45° C. |
| Powder Compartment Dissolution/sec | ca. 10 seconds | ca. 10 seconds | ca. 10 seconds | ca. 10 seconds |
| Gel Compartment Dissolution/sec | ca. 100 seconds | ca. 100 seconds | 190-285 seconds | 345-450 seconds |

It is observed that Inventive Formulation (1) exhibits an improved stability performance (i.e., greater phase separation temperature), and similar gel dissolution performance, compared to Comparative Formulation (1).

It is also observed that Inventive Formulation (3) and Inventive Formulation (4) each exhibit an improved stability performance and improved gel dissolution performance (i.e., an increased gel dissolution time) compared to Comparative Formulation (1).

In another example, Compound (2) was used instead of Compound (1) of Inventive Formulation (1) and the results of testing showed that this fatty alcohol ethoxylate with an EO content of 36, also displayed improved stability performance and improved gel dissolution performance compared to Comparative Formulation (1).

The results also show that replacement of polyalkylene glycol pentaerythritol, EO:PO of 4:1, with examples of compounds of Formula (1) with high ethoxy content (EO at least 36) provides a detergent composition with more desirable performance characteristics, such as an increased gel dissolution time for applications in which active ingredients, such as enzymes, are desired to be released into the wash later in a wash cycle.

Example 4—Cleaning Performance Test

The test was carried out according to the IKW protocol (Miele 1223 GSL2, P3/8 min, 21° GH water hardness).

| | | |
|---|---|---|
| Machine Type | Miele 1223 GSL2 | |
| Program | P3/8 min | |
| Water hardness | 21°GH/375 ppm | |
| Repetitions | 2 | |

| Type of Stain | Comparative Formulation (1) | Inventive Formulation (3) | Inventive Formulation (4) |
|---|---|---|---|
| Bleachable | | | |
| Tea | 1.2 | 1.3 | 1.1 |
| Tea with Milk | 8.6 | 9.6 | 8.9 |
| Persistent | | | |
| Alkaline-sensitive Milk Skin | 7.7 | 7.7 | 7.6 |
| Protein-containing | | | |
| Creme brûlée | 9.9 | 9.9 | 9.9 |
| Egg Yolk | 8.4 | 8.8 | 8.8 |
| Minced Meat | 10.0 | 10.0 | 10.0 |
| Starch-containing | | | |
| Pasta | 9.0 | 9.0 | 9.0 |
| Starch Mix | 9.1 | 9.2 | 9.2 |
| Average | 7.8 | 8.0 | 7.8 |

10 = Best performance, 1 = Worst performance
A difference of ≥1.0 score is considered distinctive.

It was observed that Inventive Formulations (3) and (4) each demonstrated a similar, or enhanced, cleaning performance compared to that of Comparative Formulation (1).

This shows that replacement of polyalkylene glycols with either of Compound (3) or Compound (4) provides a detergent composition with similar, or more desirable, performance characteristics to that of a detergent composition comprising a polyalkylene glycol. Thus, advantageously, it is surprisingly found that providing a detergent gel composition exhibiting a delayed release of enzymes, relative to the release of other cleaning actives, for example bleaching agents, does not negatively affect the efficacy of the enzymes during washing. As such, a detergent gel composition comprising a compound of Formula (1) has no negative impact on cleaning performance compared to a detergent gel composition comprising polyalkylene glycol pentaerythritol, EO:PO of 4:1, whilst enabling removal or reduction of non-functional filler ingredients.

Example 5—Delayed Release Profile

Example 5 includes Inventive Formulation (5). Inventive Formulation (5) comprised the composition of Inventive Formulation (1) with the addition of amylase and protease enzymes, and a bleaching system. Inventive formulation (5) was contained within a first compartment of a multi-compartment water-soluble container. The multi-compartment container comprised three separated compartments. The water-soluble container was made of PVOH. The amylase and protease enzymes were granular, and suspended in a gel compartment (first compartment) which comprised Inventive Formulation (5) in the form of a gel. The bleaching system was in the form of a solid and was included in a powder compartment (second compartment). The third compartment contained cleaning actives in the form of a liquid.

Example 5 also includes Comparative Formulation (2). Comparative Formulation (2) comprised the composition of Comparative Formulation (1) with the addition of amylase and protease enzymes, and a bleaching system. The amylase and protease enzymes were granular. The amylase and protease enzymes, and the bleaching system, were in the form of a solid, and were included in a powder compartment.

| | Comparative Formulation (2) [Granular enzymes in powder] |
|---|---|
| Machine | Bosch |
| Programme | ECO—Variospeed 1 h 27 min |
| Water Consumption | 4.2 L |
| Water Hardness | 21°GH |
| Soil | No soil |
| Further Information | No salt, No rinse aid |

| | Inventive Formulation (5) [Granular enzymes in gel] |
|---|---|
| Machine | Bosch |
| Programme | ECO—Variospeed 1 h 27 min |
| Water Consumption | 4.2 L |
| Water Hardness | 21°GH |
| Soil | No soil |
| Further Information | No salt, No rinse aid |

As shown in FIG. 1, it is observed that the relative release of enzymes amylase (A) and protease (P) in Comparative Formulation (2) is rapid and even exceeds the release of active oxygen (O). It is observed that the timepoint of 80% release of protease (P) and amylase (A) in Comparative Formulation (2) is approximately three minutes after dosing. As such, Comparative Formulation (2) comprising polyalkylene glycol pentaerythritol, EO:PO of 4:1, (a polyalkylene glycol) does not exhibit a favourable delayed release profile. Moreover, FIG. 2 shows that by including enzymes within a gel compartment comprising a unit does detergent gel composition of the invention, the release of the enzymes can be significantly delayed, relative to the release of enzymes or other cleaning actives, for example a bleaching system, comprised in a solid compartment. By providing a unit-dose product according to the invention, a favourable delayed release profile of particular cleaning actives can be obtained.

FIG. 2 shows that Inventive Formulation (5) exhibits a clear delay in the dissolution of protease (P) and amylase (A) compared to Comparative Formulation (2), and relative to the release of active oxygen (O). It is observed that the timepoint of 80% release of protease (P) and amylase (A) in Inventive Formulation (5) is approximately nine minutes after dosing, i.e. a delay of approximately six minutes relative to Comparative Formulation (2). As such, it is clear that Inventive Formulation (5), comprising Compound (1) and further comprising amylase and protease enzymes in the gel compartment, exhibits a favourable delayed release profile compared to Comparative Formulation (2) comprising polyalkylene glycol pentaerythritol, EO:PO of 4:1 (a polyalkylene glycol), and enzymes protease and amylase in solid form in a powder compartment.

The examples above show that using Compounds (2), (3) and (4), examples of compounds of Formula (1) with increasing ethoxy content, results in gels with further increased phase separation temperatures and delayed dissolution profiles (beneficial) compared to both Comparative Formulation (1) and Inventive Formulation (1), which confirms that an increase in ethoxy content of the fatty acid alcohol of Formula (1) provides increasing benefits in relation to detergent gel compositions of the invention.

The examples also show that by altering the number of moles of ethylene oxide per mole of alcohol, different congeners of Formula (1) can be formed, enabling the skilled formulator to tailor the dissolution profile of the detergent composition without affecting the cleaning performance, and therefore allowing much more flexibility in designing optimum cleaning and performance profiles.

The above embodiments are described by way of example only. Many variations are possible without departing from the scope of the invention as defined in the appended claims.

What is claimed is:

1. A packaged detergent gel composition comprising at least one fatty alcohol ethoxylate, wherein the detergent gel composition is contained within a water-soluble container; wherein the fatty alcohol ethoxylate has the formula:

$$R—O(CH_2CH_2O)_xH$$

wherein,

R is a linear, saturated fatty alkyl group, and x is an integer having a value of at least 25;

wherein the packaged detergent gel composition further comprises at least one builder selected from the group consisting of hydroxycarboxylates, aminocarboxylates, phosphates, or the salts thereof;

wherein the packaged detergent gel composition further comprises at least one mixed alkoxylate fatty alcohol non-ionic surfactant;

wherein the packaged detergent gel composition comprises less than 1 wt % polyalkylene glycol; and wherein the packaged detergent gel composition comprises the builder in an amount greater than 10 wt %.

2. The packaged detergent gel composition according to claim 1, wherein the water-soluble container is a water-soluble film.

3. The packaged detergent gel composition according to claim 1, wherein the water-soluble container comprises or is a poly(vinyl alcohol).

4. The packaged detergent gel composition according to claim 3, wherein the water-soluble container is a multi-compartment water-soluble container comprising at least a first compartment and a second compartment.

5. The packaged detergent gel composition according to claim 4, wherein at least one liquid cleaning active is located within the second compartment.

6. The packaged detergent gel composition according to claim 4, wherein at least one solid cleaning active is located within the second compartment.

7. The packaged detergent gel composition according to claim 5, wherein the at least one cleaning active located within the second compartment is a bleaching system.

8. The packaged detergent gel composition according to claim 1, wherein the packaged detergent gel composition comprises less than 0.5 wt % polyalkylene glycol.

9. The packaged detergent gel composition according to claim 4, wherein the multi-compartment water-soluble container comprises a third compartment within which is located at least one liquid cleaning active.

10. The packaged detergent gel composition according to claim 1, wherein the detergent gel composition further comprises at least one enzyme.

11. The packaged detergent gel composition as claimed in claim 1, in a unit-dose format.

12. A method of using the packaged detergent gel composition according to claim 1, comprising adding the packaged detergent gel composition to a liquid for cleaning kitchenware, hard surfaces, laundry, or fabric.

13. A method for washing kitchenware in an automatic dishwashing machine wherein the packaged detergent gel composition of claim 1 is added to the automatic dishwashing machine at the start of a main wash cycle or at the start of a pre-wash cycle.

14. A method for preparing a packaged detergent gel composition according to claim 1, the method comprising the steps of:

a) mixing a liquid component with at least one fatty alcohol ethoxylate;

b) cooling the composition formed by step a) to form a gel; and c) adding the composition to a water-soluble container.

15. A detergent gel composition comprising a fatty alcohol ethoxylate of formula:

$$R—O(CH_2CH_2O)_xH$$

wherein,

R is a linear, saturated fatty alkyl group, and x is an integer having a value of at least 25;

wherein the detergent gel composition further comprises at least one builder selected from the group consisting of hydroxycarboxylates, aminocarboxylates, phosphates, or the salts thereof;

wherein the detergent gel composition further comprises at least one mixed alkoxylate fatty alcohol non-ionic surfactant;

wherein the detergent gel composition comprises less than 1 wt % polyalkylene glycol, and wherein the detergent gel composition comprises the builder in an amount greater than 10 wt %.

16. The packaged detergent gel composition according to claim 3, wherein the container comprises a thermoformed poly(vinyl alcohol) film.

17. The packaged detergent gel composition according to claim 4, wherein the packaged detergent gel composition comprises less than 0.5 wt % polyalkylene glycol.

18. The packaged detergent gel composition according to claim 8, wherein the packaged detergent gel composition contains substantially no polyalkylene glycol.

19. The packaged detergent gel composition according to claim 10, wherein the at least one enzyme is an amylase and/or protease.

20. The packaged detergent gel composition according to claim 10, wherein the at least one enzyme is in the form of a suspended solid.

* * * * *